United States Patent [19]

Aki et al.

[11] Patent Number: 4,979,046

[45] Date of Patent: Dec. 18, 1990

[54] MAGNETIC RECORDING AND REPRODUCING APPARATUS FOR RECORDING UPPER-SIDEBOND-ELIMINATED FM SIGNAL

[75] Inventors: Shinichi Aki, Osaka; Masaaki Kobayashi, Kawanishi; Tsutomu Muraji, Osaka; Akihiro Takeuchi, Ikoma, all of Japan

[73] Assignee: Matsushita Electric Industrial Co., Ltd., Osaka, Japan

[21] Appl. No.: 253,218

[22] Filed: Oct. 3, 1988

[30] Foreign Application Priority Data

Oct. 1, 1987 [JP] Japan ............................. 62-248707

[51] Int. Cl.[5] ............................................ H04N 9/80

[52] U.S. Cl. ............................................ 358/330

[58] Field of Search .................... 360/29, 69, 33.1, 30; 358/355, 330, 315, 316, 327

[56] References Cited

U.S. PATENT DOCUMENTS

| | | | |
|---|---|---|---|
| 3,424,861 | 1/1969 | Delvaux | 360/29 |
| 3,704,349 | 11/1972 | Goshima et al. | 360/29 |
| 4,077,046 | 2/1978 | Morio | 360/29 |

OTHER PUBLICATIONS

"Video Tape Recorder Design", Journal of the SMPTE, vol. 66, No. 4, Apr. 1957.

*Primary Examiner*—Donald McElheny, Jr.

*Attorney, Agent, or Firm*—Wenderoth, Lind & Ponack

[57] ABSTRACT

A magnetic recording and reproducing apparatus which converts a video signal to an FM signal and records the FM signal on a magnetic recording medium has a filter which eliminates an upper sideband component of the FM signal before recording so as to thereby enhance an increase of the levels of the lower sideband components of the reproduced and thereby improve its S/N ratio FM signal.

3 Claims, 4 Drawing Sheets

MAGNETIC RECORDING AND REPRODUCING APPARATUS FOR RECORDING UPPER-SIDEBOND-ELIMINATED FM SIGNAL

BACKGROUND OF THE INVENTION

1. Field of the Invention

The present invention relates to a magnetic recording and reproducing apparatus such as a video tape recorder.

2. Description of Prior Art

As described in "Video Tape Recorder Design"; *Journal of the SMPTE*, Vol.66, No.4, Apr. 1957, FM (frequency modulation) is used for recording a video signal in a video tape recorder. Also, it is well known that a FM signal, having passed through a tape-head system, has an increased lower sideband level. Furthermore, it is well known that when the noise level is constant, an FM signal having a larger sideband component level is more useful for improving the S/N ratio (signal/noise ratio). The amount of increase in the level of the lower sideband depends on the characteristics of the tape head system, but is at most 7 dB. In order to further improve the S/N ratio of the reproduced video signal, further enlargement of the level of the lower sideband of the reproduced FM signal has been desired.

SUMMARY OF THE INVENTION

An object of the present invention is to obtain an improvement in the S/N ratio and frequency characteristics by , enlarging the amount of increase in the level of the lower sideband of the reproduced FM signal.

The inventors discovered that, when an upper sideband component of an FM signal is attenuated before the FM signal is recorded on a recording medium, the amount of increase in the levels of the lower sideband components of the signal reproduced from the recording medium is enlarged. Accordingly, the magnetic recording and reproducing apparatus of the present invention is provided with a circuit which attenuates at least one of the upper sideband components of an FM signal before recording the FM signal on a recording medium.

By means of the above construction, it is possible to further increase the amount of increase in the levels of the lower sideband components of the reproduced FM signal without varying the noise level in reproducing, so that it is possible to improve the S/N ratio and frequency characteristics.

DESCRIPTION OF PREFERRED EMBODIMENT

Figure 1:
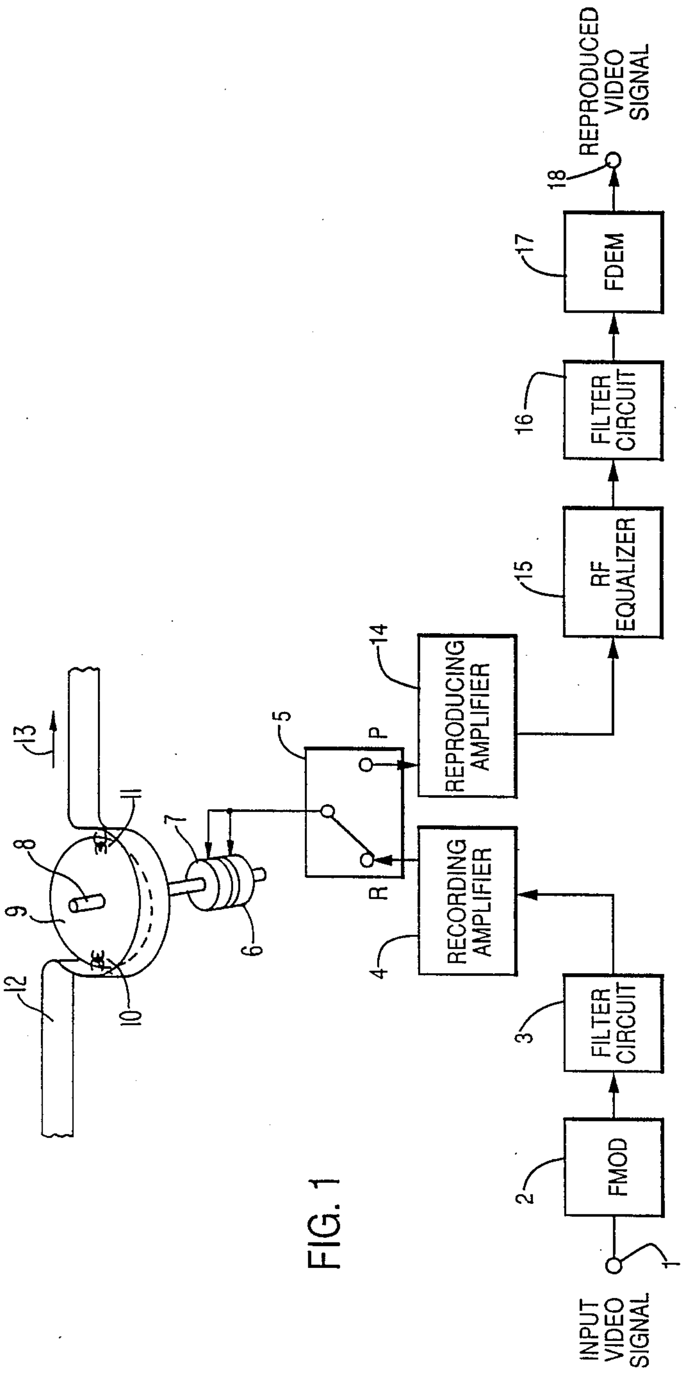
FIG. 1 is a block diagram showing an essential construction in one embodiment of the present invention.
Figure 2A:
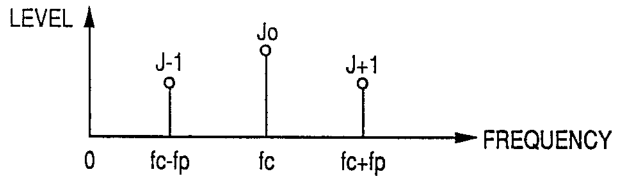
FIGS. 2(*a*)–(*g*) are schematic diagrams showing of the signal frequency spectrum at respective points in FIG. 1.
Figure 2B:
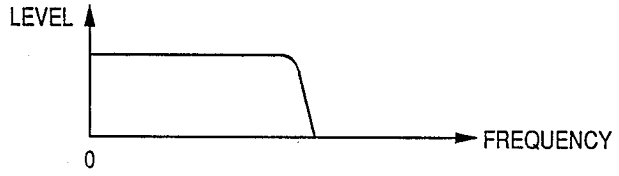
Figure 2C:
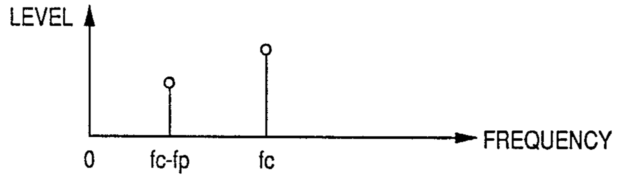
Figure 2D:
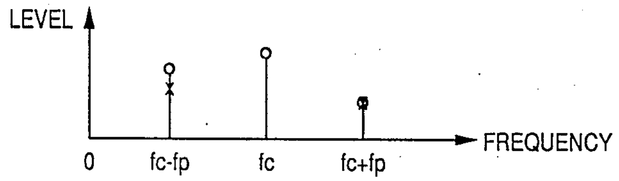
Figure 2E:
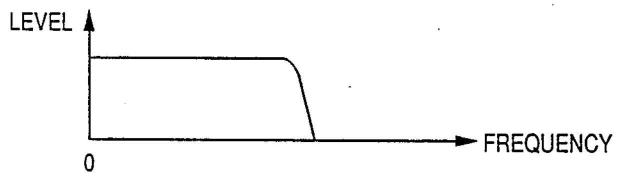
Figure 2F:
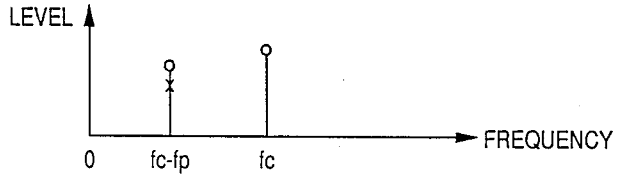
Figure 2G:
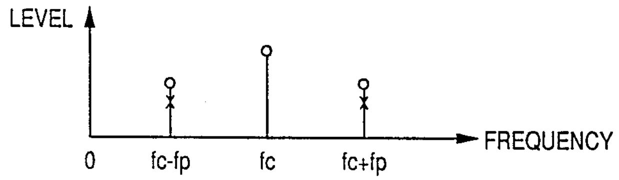

In FIG. 1, a video signal is inputted to an input terminal 1, and converted into an FM signal having a frequency deviation range of, for example, 5.4 MHz–7.0 MHz in a frequency modulation circuit (FMOD) 2. Then, the FM signal is subjected to attenuation of its upper sideband by a filter circuit 3, and sent via a recording amplifier 4 to a selection switch 5 for selection between recording and reproducing. When the selection switch 5 is connected to its R side, the output signal of the recording amplifier 4 is supplied to magnetic heads 10 and 11 through rotary transformers 6 and 7, and recorded on a magnetic tape 12. The magnetic heads are mounted on a rotary disk 9 which is rotated at a prescribed speed by a motor (not illustrated) connected to a rotary shaft 8. On the other hand, the magnetic tape 12 is wound around the rotary disk 9 over 180° , and caused to run at a prescribed speed in the direction of an arrow 13 by means of a well known magnetic tape driving mechanism including a capstan, pinch rollers, etc.

In reproducing, the recorded signal is reproduced by the magnetic heads 10 and 11. This reproduced signal contains the upper sideband components produced by the non-linearity of the frequency characteristics of electromagnetic conversion system constituted by the head and the tape. By connecting the selection switch 5 to its P side, the reproduced signal is fed via a reproducing amplifier 14 to an RF equalizer 15 which adjusts the level of the lower sideband components of the reproduced FM signal. At this time, the noise level is also reduced in proportion to the amount of reduction of the lower sideband component level. The output of the RF equalizer 15 has of its upper sideband components attenuated by a filter circuit 16, and then demodulated by a frequency demodulator (FDEM) 17. The demodulated signal is outputted from an output terminal 18.

In the frequency modulation circuit 2 and the frequency demodulation circuit 17, there may be included the circuits which are used in general video tape recorders such as a preemphasis circuit, deemphasis circuit, etc. Furthermore, a recording equalizer may be included in the recording amplifier 4.

An example of the frequency spectrum of the signals at respective points in FIG. 1 is schematically shown in FIGS. 2(*a*)–(*g*). FIG. 2(*a*) shows a frequency spectrum of the output signal of the frequency modulation circuit 2. In FIGS. 2(*a*)–(*g*), assume the frequency of the carrier wave (to be represented by $J_0$) to be fc, the frequency of the first lower sideband component (to be represented by $J_{-1}$) to be fc–fp, and the frequency of the first upper sideband component (to be represented by $J_1$) to be fc+fp. That is to say, assume that the frequency of the inputted video signal is fp. In FIG. 2(*a*), only the first sideband components are illustrated, but the following explanation can be applied to the case where higher sideband components are considered. The filter circuit 3 is a low-pass filter having a frequency characteristic shown in FIG.2(*b*). FIG. 2(*c*) shows a frequency spectrum of the output signal of the filter circuit 3. FIG. 2(*d*) shows a frequency spectrum of the FM signal recorded and reproduced through the tape-head system, i.e., the output signal of the reproducing amplifier 14, indicative of the level increase in the lower sideband. Further, as shown in FIG. 2(*d*), an upper sideband component has been generated. The filter circuit 16 is a low-pass filter having a frequency characteristic of FIG. 2(*e*). FIG. 2(*f*) shows a frequency spectrum of the FM signal after passed through the RF equalizer circuit 15 and the filter circuit 16. It is seen that the upper sideband component, which has a small S/N ratio, is attenuated.

Here, an explanation is provided on assumption that the equalizer circuit 15 has flat frequency characteristics. In effect, however, the equalizer circuit 15 may be a cosine equalizer. FIG. 2(*g*) shows a frequency spectrum of the output signal of the frequency demodulation circuit 17 which has a limiter circuit in the same way as the ordinary frequency demodulator. By passing through the limiter circuit, the upper sideband component is recovered.

In FIGS. 2(*d*), (*f*) and (*g*), the levels of conventional frequency spectrum are shown by the mark X, and the levels of the frequency spectrum in the present invention by the mark O.

As shown in FIG. 2(*d*), there is an increase in the level of the lower sideband component of the reproduced signal reproduced from the tape which is more than the conventional apparatus. As a result, as shown in FIG. 2(*g*), the levels of the sideband components of the ultimately obtained reproduced signal become higher than that of the conventional apparatus.

In FIGS. 2(*a*)–(*g*), although no noise component has been indicated, it has been confirmed that there is no change in the noise level.

Figure 3:
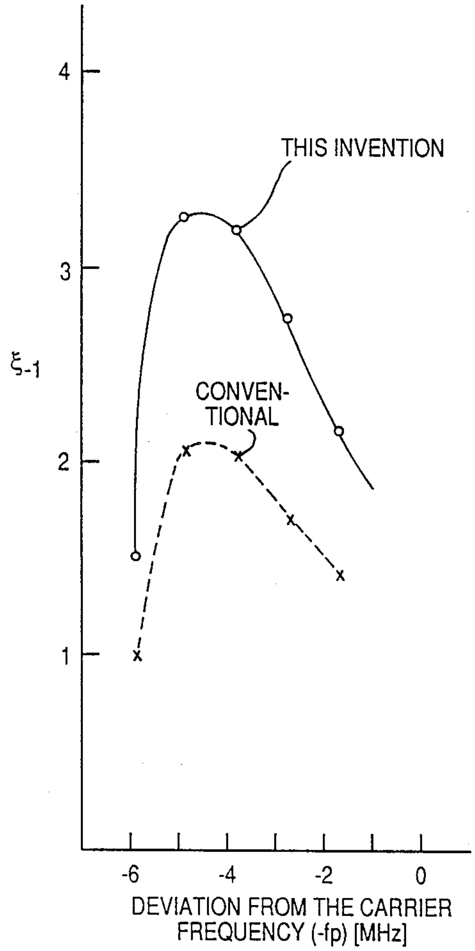
FIG. 3 is a graph showing an example of the variation rates of the lower sideband components in the recording method according to the present invention and the conventional recording method.

FIG. 3 shows the examples of the variation rates of the lower sideband component level in FIG. 2(*d*) in the case of recording with attenuation of the upper sideband component of FM signal (mark O and solid line) and the case of recording without such attenuation (mark X and broken line), representing that the amount of level increase in the lower sideband is larger for the case of recording with attenuation of the upper sideband component.

Assuming that the amplitude $J_0$ of the carrier wave and the amplitude $J_{-1}$ of the first lower sideband component have changed to $J'_0$ and $J'_{-1}$, respectively after being passed through the tape-head system, $\zeta_{-1}$ is defined as:

$$\zeta_{-1} = \frac{J_{-1}'/J_0'}{J_{-1}/J_0}$$

The amount of level increase in the lower sideband becomes 3–4 dB larger in the case where the upper sideband component is attenuated in recording than in the case where the upper sideband component is not attenuated.

Figure 4:
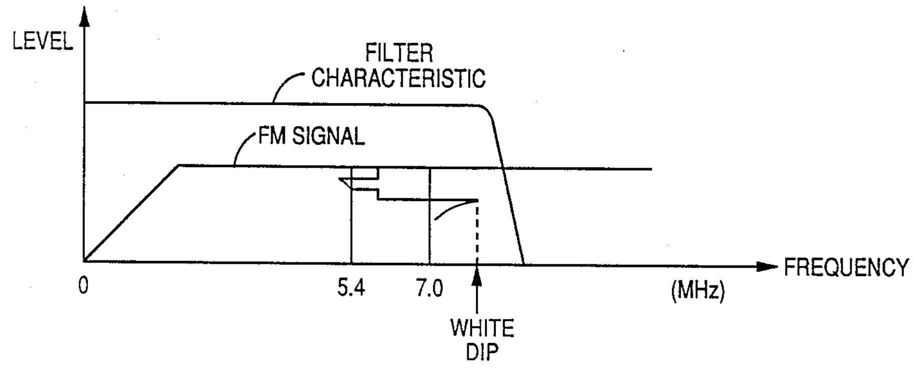
FIG. 4 is a characteristic diagram showing an example of a frequency characteristic of a low-pass filter circuit.

When the attenuation frequency range of the filter circuit 3 having the low-pass filter characteristic of FIG. 2)*b*) is set higher than the frequency corresponding to the white clip in the case where a video signal is subjected to frequency modulation as shown in FIG. 4, the carrier wave component is not affected.

In the above explanation, a description has been provided in the case of recording and reproducing the frequency modulated signal of a video signal. Needless to say, similar results are obtainable with the so-called color under-recording system such as, for example, a VHS system or a $\beta$ system.

Figure 5:
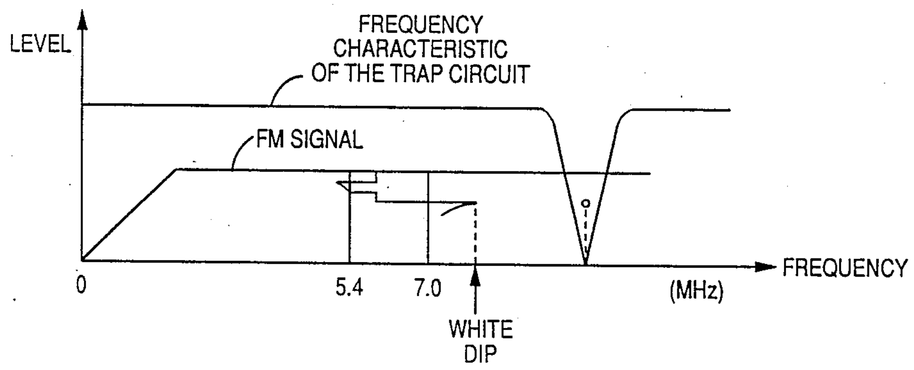
FIG. 5 is a characteristic diagram showing an example of a frequency characteristic of a trap circuit.
Figure 6:
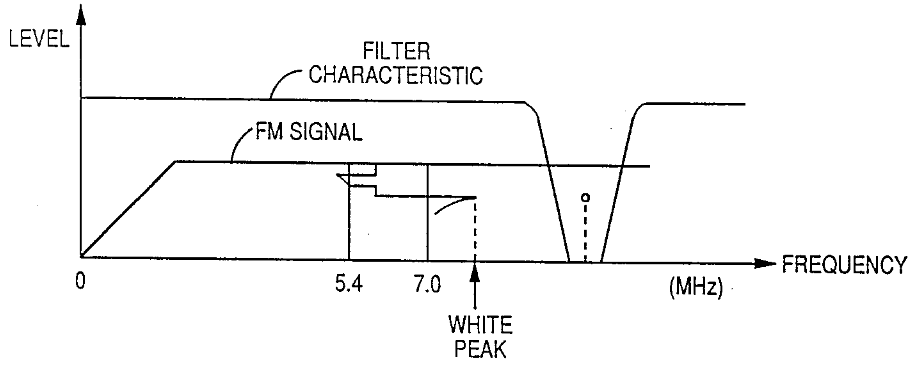
FIG. 6 is a characteristic diagram showing an example of a frequency characteristic of a band elimination filter circuit.

In the foregoing explanation, an example of a low-pass filter has been shown as the filter circuit 3, but the filter circuit 3 may be a trap circuit having a frequency characteristic as shown in FIG. 5 or a band elimination filter having a frequency characteristic as shown in FIG. 6. The mark O and the broken line show an upper sideband component. The trap circuit having the characteristic of FIG. 5 and the band elimination filter having the characteristic of FIG. 6 may be those which attenuate a component of the highest level out of the upper sideband components having a higher frequency than the white clip frequency.

What is claimed is:

1. A magnetic recording and reproducing apparatus comprising:

a frequency modulation means for frequency-modulating an input video signal to obtain a frequency-modulated signal;

a filter means for eliminating an upper sideband component of said frequency-modulated signal from said frequency-modulated signal while maintaining the level of a carrier frequency component of said frequency-modulated signal constant;

a recording and reproducing means for recording an output signal of said filter means on a magnetic recording medium and for reproducing the recorded signal from said recording medium; and a frequency demodulation means for frequency-demodulating the reproduced signal from said recording and reproducing means to obtain a reproduced video signal.

2. The apparatus according to claim 1, further comprising another filter means provided between said recording and reproducing means and said frequency demodulation means for eliminating an upper sideband component of said frequency-modulated signal, said upper sideband component being produced when the recorded signal is reproduced by said recording and reproducing means from said recording medium.

3. The apparatus according to claim 1, wherein the upper sideband component eliminated by said filter means has a frequency which higher than a frequency corresponding to a white clip level of said frequency modulation means.

* * * * *